(12) United States Patent
Akutsu et al.

(10) Patent No.: US 6,411,339 B1
(45) Date of Patent: Jun. 25, 2002

(54) METHOD OF SPATIO-TEMPORALLY INTEGRATING/MANAGING A PLURALITY OF VIDEOS AND SYSTEM FOR EMBODYING THE SAME, AND RECORDING MEDIUM FOR RECORDING A PROGRAM FOR THE METHOD

(75) Inventors: Akihito Akutsu; Yoshinobu Tonomura; Hiroshi Hamada, all of Kanagawaken (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/090,642

(22) Filed: Jun. 4, 1998

Related U.S. Application Data

(63) Continuation of application No. PCT/JP97/03526, filed on Oct. 2, 1997.

(30) Foreign Application Priority Data

Oct. 4, 1996 (JP) ............................................... 8-263986

(51) Int. Cl.$^7$ .......................... H04N 7/00; H04N 7/18; H04N 9/74; H04N 5/14; G06K 9/36
(52) U.S. Cl. ...................... 348/584; 348/36; 348/157; 348/159; 348/218; 348/586; 348/700; 382/103; 382/195; 382/284
(58) Field of Search .......................... 348/208, 36, 218, 348/584, 586, 39, 159, 157, 699, 700; 382/103, 190, 195, 284, 294

(56) References Cited

U.S. PATENT DOCUMENTS

| | | | | |
|---|---|---|---|---|
| 5,424,773 A | * | 6/1995 | Saito | 348/218 |
| 5,513,854 A | * | 5/1996 | Daver | 348/157 |
| 5,646,679 A | * | 7/1997 | Yano et al. | 348/586 |
| 5,657,402 A | * | 8/1997 | Bender et al. | 382/284 |
| 5,689,302 A | * | 11/1997 | Jones | 348/218 |
| 5,754,225 A | * | 5/1998 | Naganuma | 348/155 |
| 5,907,361 A | * | 5/1999 | Okada | 348/399 |
| 5,940,538 A | * | 8/1999 | Spiegel et al. | 382/236 |
| 5,953,056 A | * | 9/1999 | Tucker | 348/157 |
| 6,049,619 A | * | 4/2000 | Anandan et al. | 382/103 |
| 6,069,918 A | * | 5/2000 | Meyer et al. | 375/240.17 |
| 6,141,041 A | * | 10/2000 | Carlbom et al. | 348/169 |
| 6,211,911 B1 | * | 4/2001 | Komiya et al. | 348/218 |
| 6,233,007 B1 | * | 5/2001 | Carlbom et al. | 348/157 |
| 6,320,624 B1 | * | 11/2001 | Ayer et al. | 348/584 |

FOREIGN PATENT DOCUMENTS

JP 5-304675 11/1993

* cited by examiner

Primary Examiner—Wendy R. Garber
Assistant Examiner—John M Villecco
(74) Attorney, Agent, or Firm—Olson & Hierl, Ltd.

(57) ABSTRACT

A camcorder operation condition detecting portion (103) reads image data string and detects camcorder on/off information and camcorder operating information. A video splitting portion (104) splits videos into respective shots based on the camcorder on/off information. A subject/background separating portion (105) separates a subject and a background based on the camcorder operating information, etc. A subject motion information extracting portion (106) correlates subject information separated every frame between frames. A video taken space resynthesizing portion (107) resynthesizes video taken spaces based on the camcorder operating information and the background. A shot-to-shot relation calculating portion (108) calculates spatial shot-to-shot relations between a plurality of video taken spaces. Hence, respective information of camcorder on/off, camcorder operation, subject, subject motion, resynthesized background, and shot-to-shot relation information can be spatio-temporally managed/stored, and the video taken spaces and one or more subjects can be resynthesized, displayed, or output in accordance with user's requests, etc.

57 Claims, 10 Drawing Sheets

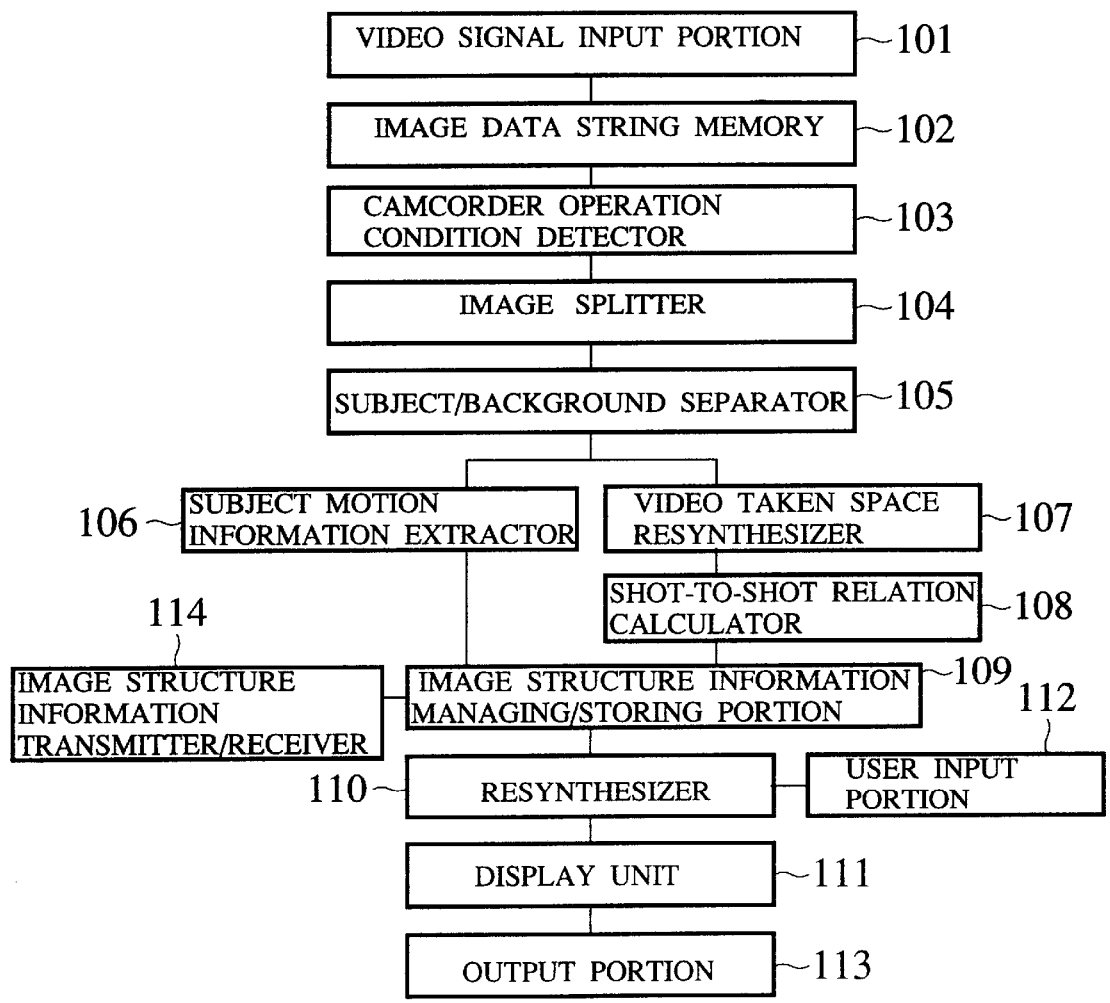
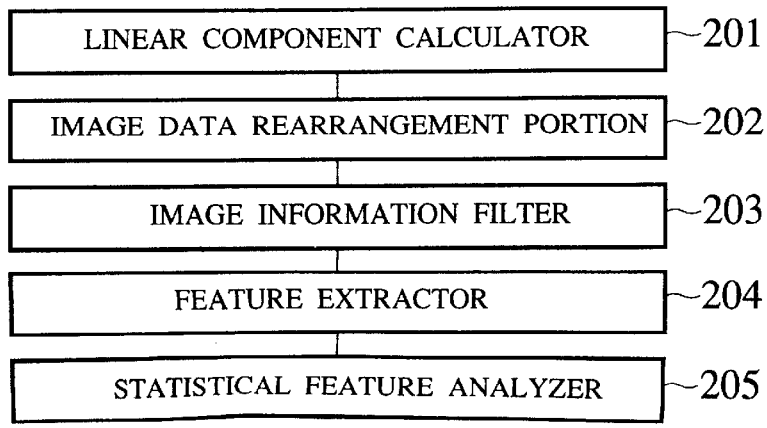

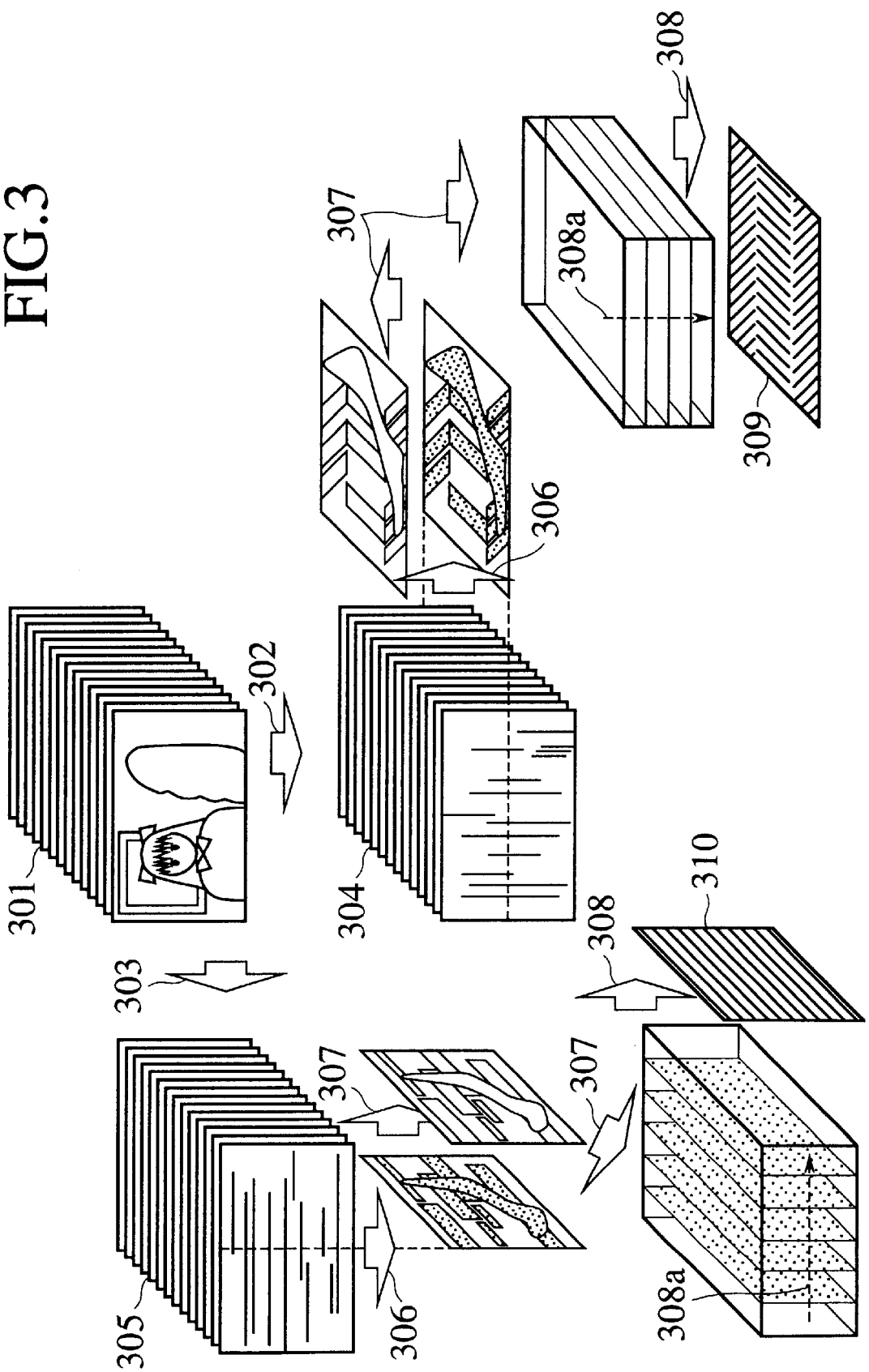

```
┌─────────────────────────────────┐
│  CAMCORDER OPERATION CANCELER   │─601
├─────────────────────────────────┤
│     IMAGE DATA COMPARATOR       │─602
├─────────────────────────────────┤
│ COMPARISON IMAGE DATA COMPARATOR│─603
├─────────────────────────────────┤
│         AREA EXTRACTOR          │─604
└─────────────────────────────────┘
```

METHOD OF SPATIO-TEMPORALLY INTEGRATING/MANAGING A PLURALITY OF VIDEOS AND SYSTEM FOR EMBODYING THE SAME, AND RECORDING MEDIUM FOR RECORDING A PROGRAM FOR THE METHOD

This is a continuation of Japanese Patent Application PCT/JP97/03526 filed on Oct. 2, 1997, claiming priority of Japanese Patent Application Serial No. P8-263986 filed on Oct. 4, 1996.

TECHNICAL FIELD

The present invention relates to a technology for generating new videos by integrating a plurality of videos and, more particularly, a method of spatio-temporally integrating/managing a plurality of videos and a system for embodying the same and a recording medium for recording a program for carrying out the method.

BACKGROUND ART

With the progress of high performance of the computer, large capacity of the hard disk, reduction in size and digitization of the camcorder, and lower costs of them, spread of these devices into general families has been accelerated. According to such spread of the high performance computer and the mass storage hard disk and in addition establishment of the information compression technology, digitization of videos has become close to us. According to such digitization the videos, the videos have be able to be handled with the general-purpose personal computer and also be output to the high resolution display for the personal computer. In general, the videos have been limited to be output to the TV monitor (640×480 pixels) only, but this has enabled the videos to be output by the resolution in excess of the resolution of the TV monitor. For example, a plurality of videos has been able to be displayed simultaneously on the display for the personal computer, etc.

With such development of video devices, several methods of enhancing the videos have been reported. In a literature, Michael Irani and Samuel Peleg; "Motion Analysis for Image Enhancement: Resolution, Occlusion and Transparency", Journal of Visual Communication and Image Representation, Vol.4, No.4, December, pp.324–335, 1993, the method of achieving the high resolution of the videos by using motion information in the videos and the method of interpolating the background hiding area caused by the subject, etc. have been proposed. In addition, Laura A. Teidcio has reported the method of generating the high resolution still pictures from the videos (Patent Application Publication (KOKAI) Hei 5-304675). In recent, ORAD Corporation has published the system "Digital Replay" which can implement reproduction of the videos to which new values added are attached. As system functions, for example, the system has have the functions of enhancement representation, tracing, and magnification of the subject, and the function for displaying information of figures and segments thereof, distances and velocities, etc. together with the videos.

Moreover, there has been reported a new user interface of the videos. In a literature, "A Magnifier Tool for Video Data", Proceedings of CHI '92, pp.93–98 (1992), M. Mill et al. have reported that the video frames are arranged in the space according to the resolution level of time, so that the new video looking and accessing style to the time can be attained from coarse time resolution to fine time resolution. Still more, in a literature, "Motion Image Processing", Striking Possibilities, ADVANCED IMAGING, AUGUST (1992), E. Elliot and A. W. Davis have reported that the new representing method of time information of the videos and the intuitive access to the time information can be achieved by representing three-dimensional object, i.e., video picture (two-dimensional)+time (one-dimensional).

In the meanwhile, under circumstances in which it becomes easy to input the videos by the camcorder and display style can be made free, the request for handling of a plurality of videos has occurred. For example, "a plurality of videos" used herein signifies either the plurality of videos which are picked up by a plurality of camcorders set up in the sport stadium such as the Olympics or the videos which are picked up by a single camcorder but show behaviors of different players. Further, "handling" used herein signifies that the plurality of videos are appreciated, compared, searched, edited, etc. simultaneously.

However, according to the above reports in the prior art, there have been unsolved problems in the plurality of videos. According to the reports in the prior art, the enhancement of one shot has been achieved, but the enhancement of the plurality of videos by applying relations between plural videos to the plurality of videos has not been implemented. In addition, the plurality of videos have not integrated spatio-temporally and managed integratedly. "Enhancement of the plurality of videos" used herein signifies to execute the correlation between the plurality of videos, to extract automatically the video contents information (object information reflected actually on the videos, i.e., subject information), and to represent them visually. Also, it signifies to generate one or plural videos in which correlation of the plurality of videos and the video contents information are represented visually. For instance, one example is to generate one video, in which respective players are overlapped in the common space, from the plurality of videos which pick up behaviors of different players. "To manage spatio-temporally" is that information extracted based on the spatio-temporal video structure is managed integratedly. For example, the subject and the background are separated and managed respectively and also their spatio-temporal relation information are managed. To manage the plurality of videos integratedly by using the spatio-temporal structure has not been included in the object of the prior art. It has been impossible to manage the plurality of videos spatio-temporally integratedly only by combining merely the prior arts.

In the prior art, the implemented video user interface has represented the videos again simply, so that it has not extracted positively information of the videos and relations between the plurality of videos to enhance the videos. Since the contents of the videos and the relations between the plurality of videos have not been taken into account, it has been impossible to grasp intuitively the videos and the contents of the videos and enhance newly the video information, especially, information concerning the time. Also, since the plurality of videos have not been managed spatio-temporally, it has been impossible to interact the contents of the videos more precisely.

Like the above, according to the reports as with the enhancement of the videos, the user interface, etc. reported in the prior art, there has been no enhancement to assign high value added to the plurality of videos and no representation which can manage, represent, and operate the videos spatio-temporally integratedly. In other words, there have been problems in the prior art.

It is an object of the present invention to provide a method of spatio-temporally integrating/managing a plurality of videos and a system for embodying the same and a recording medium for recording a program for carrying out the method, which are capable of integrating spatio-temporally a plurality of videos to enhance the videos and managing, representing, and operating spatio-temporally integratedly a plurality of videos, in order to acquire information of plural videos from a plurality of videos picking up the same space effectively in response to user's interest and object in their own style.

DISCLOSURE OF INVENTION

In order to achieve the above object, the present invention provides a system for spatio-temporally integrating/managing a plurality of videos, comprising: an image data string memory portion for reading video data to save them as data string; a camcorder operation condition detecting portion for reading the data string from the image data string memory portion and detecting camcorder operation condition information including camcorder on/off information and camcorder operating information; a video splitting portion for splitting videos of the data string into respective shots based on the camcorder on/off information; a subject/background separating portion for separating a subject and a background every frame of the videos by using the camcorder operating information and physical feature properties; a subject motion information extracting portion for correlating subject information separated every frame between frames; a video taken space resynthesizing portion for resynthesizing video taken spaces from which the videos are picked up, based on the camcorder operating information and the background separated every frame; a shot-to-shot relation calculating portion for calculating spatial shot-to-shot relations between a plurality of video taken spaces, which are resynthesized by the video taken space resynthesizing portion respectively, based on a plurality of shots being separated; and a video structure information managing/storing portion for managing/storing separated subject information, correlated subject information, the camcorder operation condition information, background information, and shot-to-shot relation information.

Also, the above system for spatio-temporally integrating/managing a plurality of videos, further comprises: a video structure information transmitter/receiver for transmitting or receiving all or a part of extracted subject information, the camcorder operation condition information, the background information, the shot-to-shot relation information, and the video data.

Similarly, the above system for spatio-temporally integrating/managing a plurality of videos, further comprises: a resynthesizer for resynthesizing one or plural video taken spaces and one or plural subjects based on information stored/managed in the video structure information managing/storing portion in compliance with one or both of predetermined conditions and user's requests; a display unit for displaying resynthesized videos in the resynthesizer; a user input portion for inputting the user's requests for resynthesis based on the videos which are displayed on the display unit; and an output portion for outputting the videos which are displayed on the display unit to an external device in a digital or analogue manner.

In order to achieve the above object, the present invention provides a method of spatio-temporally integrating/managing a plurality of videos, comprising: an image data string saving step of reading video data to save the video data as data string in an image data string memory portion; a camcorder operation condition detecting step of reading the data string from the image data string memory portion and detecting camcorder operation condition information including camcorder on/off information and camcorder operating information; a video splitting step of splitting videos of the data string into respective shots based on the camcorder on/off information; a subject/background separating step of separating a subject and a background every frame of the videos by using the camcorder operating information and physical feature properties; a subject motion information extracting step of correlating subject information separated every frame between frames; a video taken space resynthesizing step of resynthesizing video taken spaces from which the videos are picked up, based on the camcorder operating information and the background separated every frame; a shot-to-shot relation calculating step of calculating spatial shot-to-shot relations between a plurality of video taken spaces, which are resynthesized by the video taken space resynthesizing step respectively, based on a plurality of shots being separated; and a video structure information managing/storing step of managing/storing separated subject information, correlated subject information, the camcorder operation condition information, background information, and shot-to-shot relation information.

Also, the method of spatio-temporally integrating/managing a plurality of videos, further comprises: a video structure information transmitting/receiving step of transmitting or receiving all or a part of extracted subject information, the camcorder operation condition information, the background information, the shot-to-shot relation information, and the video data.

Similarly, the method of spatio-temporally integrating/managing a plurality of videos, further comprises, after the video structure information managing/storing step: a resynthesizing step of resynthesizing one or plural video taken spaces and one or plural subjects based on stored/managed information in compliance with one or both of predetermined conditions and user's requests; and a display or outputting of displaying or outputting videos resynthesized by the resynthesizing step.

In order to achieve the above object, the present invention provides a computer readable recording medium for recording a program for spatio-temporally integrating/managing a plurality of videos, comprising: an image data string saving step of reading video data to save the video data as data string in an image data string memory portion; a camcorder operation condition detecting step of reading the data string from the image data string memory portion and detecting camcorder operation condition information including camcorder on/off information and camcorder operating information; a video splitting step of splitting videos of the data string into respective shots based on the camcorder on/off information; a subject/background separating step of separating a subject and a background every frame of the videos by using the camcorder operating information and physical feature properties; a subject motion information extracting step of correlating subject information separated every frame between frames; a video taken space resynthesizing step of resynthesizing video taken spaces from which the videos are picked up, based on the camcorder operating information and the background separated every frame; a shot-to-shot relation calculating step of calculating spatial shot-to-shot relations between a plurality of video taken spaces, which are resynthesized by the video taken space resynthesizing step respectively, based on a plurality of shots being separated; and a video structure information managing/storing step of managing/storing separated subject information, correlated subject information, the camcorder operation condition information, background information, and shot-to-shot relation information.

Also, the computer readable recording medium for recording a program for spatio-temporally integrating/managing a plurality of videos, further comprises: a video structure information transmitting/receiving step of transmitting or receiving all or a part of extracted subject information, the camcorder operation condition information, the background information, the shot-to-shot relation information, and the video data.

Similarly, the computer readable recording medium for recording a program for spatio-temporally integrating/managing a plurality of videos, further comprises, after the video structure information managing/storing step; a resynthesizing step of resynthesizing one or plural video taken spaces and one or plural subjects based on stored/managed information in compliance with one or both of predetermined conditions and user's requests; and a display or outputting of displaying or outputting videos resynthesized by the resynthesizing step.

According to the present invention, video data are read, then saved image data string are read out, then camcorder operation condition information including camcorder on/off information and camcorder operating information are detected, then videos are split into respective shots based on the camcorder on/off information, then the subject and the background are separated frame by frame by using the camcorder operating information and physical feature properties, then subject motion information are extracted by correlating separated subject information between frames, then the video taken spaces are resynthesized based on the camcorder operating information and the background every frame, then spatial shot-to-shot relations are calculated between a plurality of pick-up spaces which are resynthesized based on a plurality of shots respectively, and above resultant information are managed/stored. As a result, spatio-temporal integration of a plurality of videos can be achieved which enables the spatio-temporal enhancement of the plurality of videos, spatio-temporal and integrated management, representation, and operation.

By transmitting or receiving all or a part of extracted subject information, etc., the user can select, search, or pick up such information freely at any location or transmit them to any users located at any location. In addition, any user can send such information into the system from any location.

In addition, since one or plural video taken spaces and one or plural subjects are resynthesized, displayed, or output to an external device in analogue/digital manners based on the above managed and stored information in compliance with the predetermined conditions and the user's request, the users can acquire information of plural videos from a plurality of videos picking up the same space simultaneously, intuitively, and effectively in response to their interest and object in their own style.

BRIEF DESCRIPTION OF DRAWINGS

FIG. 1 is a view showing a configuration of an embodiment of the present invention and a flow of processes carried out therein;

FIG. 2 is a view showing a configuration of a camcorder operation condition detector in the above embodiment and a flow of processes carried out therein;

FIG. 3 is a flowchart showing processes in the camcorder operation condition detector in the above embodiment;

BEST MODE FOR CARRYING OUT THE INVENTION

Figure 4:
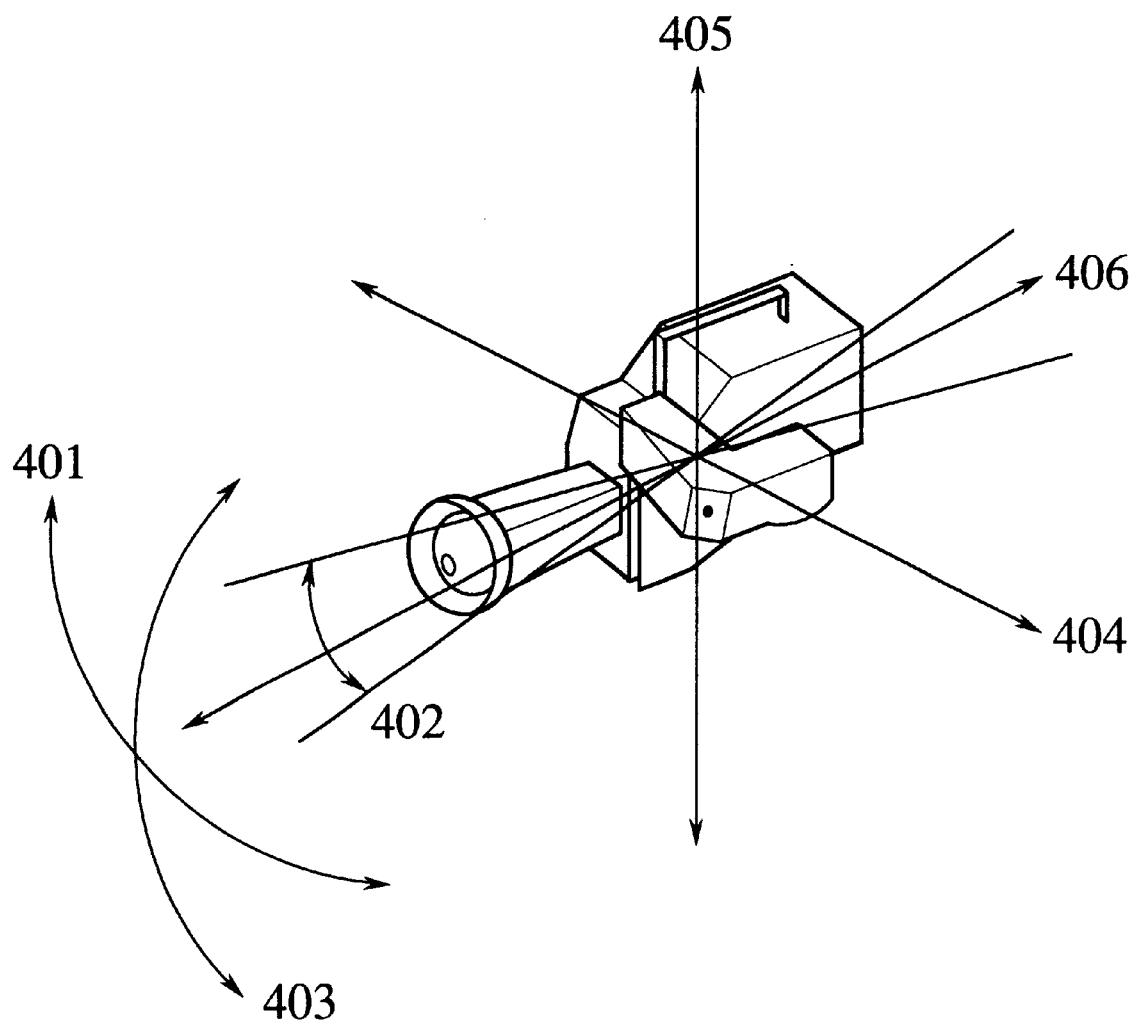
FIG. 4 is a view showing camcorder operating information in the above embodiment.

An embodiment of the present invention will be explained in detail with reference to the accompanying drawings hereinafter.

A system configuration of an embodiment of the present invention is shown in FIG. 1. Respective constituent portions and a flow of processes will be explained along with the view showing the system configuration hereinafter.

Video signals input from a video signal input portion 101 in FIG. 1 are stored temporarily in an image data string memory 102. Then, the stored video signals are processed in a camcorder operation condition detector 103 to extract camcorder on/off information and camcorder operating information.

A configuration of the camcorder operation condition detector 103 is shown in FIG. 2. A flow of processes carried out by constituent elements 201 to 204 in the camcorder operation condition detector 103 is shown in FIG. 3. With reference to these figures, configurations of respective constituent elements and flows of processes carried out therein will be explained in detail hereinafter.

Several frames of the video signals read from the image data string memory 102 are 301 shown in FIG. 3. Normally such 301 is called spatio-temporal images. Horizontal/vertical linear components are calculated from the spatio-temporal images every frame image in a linear component calculator 201 respectively. Vertical linear calculation is 302 in FIG. 3 and horizontal linear calculation is 303 in FIG. 3. 304 and 305 obtained by these calculations are called vertical linear component spatio-temporal images and horizontal linear component spatio-temporal images respectively.

In turn, an image data rearrangement portion 202 may rearrange the vertical linear component spatio-temporal images 304 and the horizontal linear component spatio-temporal images 305 by using an image data string rearrangement means to prepare for succeeding filter process. Rearrangement process herein corresponds to 306 in FIG. 3, in which the spatio-temporal images are cut with a plane including normals of the screen. A direction orthogonal to x and y coordinate axes of the frame image is set as a normal direction of the screen. In general a plane including cut time axes is called a spatio-temporal sectional image. As an example of this spatio-temporal sectional image, there is a cutting plane (Epipolar Plane Images) derived when the spatio-temporal images are cut with the plane including the moving direction of the camcorder and the normals of the screen, which has been employed in the field of the computer vision. Three-dimensional position of the subject can be estimated from the spatio-temporal sectional images. This is because a locus of feature points of the object appears as a straight line on the epipolar plane images and a gradient of such straight line indicates magnitude of motions of the feature points of the object (R. C. Bolles, H. Baker and D. H. Marimont; "Epipolar-Plane Image Analysis: An Approach to Determine Structure from Motion", IJCV, 1, 1, pp.7–55, June 1989). The spatio-temporal cutting images which are generated by cutting the spatio-temporal images so as to include x and t coordinate axes are called particularly x-t spatio-temporal images. Similarly, the spatio-temporal cutting images which include y and t coordinate axes are called y-t spatio-temporal images. Any x-t spatio-temporal images can be cut out with any values of y and then a plurality of sheets of x-t spatio-temporal images are called x-t spatio-temporal image string. The same is true of y-t spatio-temporal image string.

The cutting planes of the vertical/horizontal linear component spatio-temporal images which have been cut in the image data rearrangement portion 202 are treated with a filter process (such as linear differential, quadratic differential, etc.) in a video information filter processor 203. The process is carried out by a segment detecting means and is aimed at detecting edges or lines. In FIG. 3, the process corresponds to 307. The strength of such edges or lines can be calculated by the filter processor 203. Flow patterns which appear on the cutting surface of the cutting image along with the time axis are caused due to motions in the videos. A direction of such flow coincides with the magnitude of motion. The edges or lines representing the direction of flow are detected according to the above edge detection, which yields that only motion information out of the images are enhanced. Cutting image string which have been subject to above edge detection are called vertical/horizontal spatio-temporal edge image string.

Subsequently, the vertical/horizontal spatio-temporal edge image string are added by an integration means along the normal direction of the edge images in a feature extractor 204. In FIG. 3, the process corresponds to 308 and the addition process is executed along a direction indicated by a broken line 308a. This addition process is carried out so as to enhance much more the motions which have been enhanced by the previous filter process. More particularly, the motions of the feature points of the object, if generated as global motions, are enhanced mutually by carrying out the addition process, so that they can be reflected remarkably on the result of the addition process. In contrast, the motions of the feature points of the object, if generated as local motions, are weakened mutually by carrying out the addition process, so that they are difficult to be reflected on the result of the addition process. In addition, the addition process is resistant to noises unlike the difference process, which means that the motion information can be extracted from the videos including much noises. Resultant images obtained by the addition process are called spatio-temporal projection images. X-t spatio-temporal projection images 309 can be generated from the x-t vertical spatio-temporal image string, while y-t spatio-temporal projection images 310 can be generated from the y-t horizontal spatio-temporal image string. Flow patterns generated along the time axis of the x-t spatio-temporal projection images represents motions of the videos in the horizontal direction, while flow patterns of the y-t spatio-temporal projection images represents motions of the videos in the vertical direction.

In turn, in a statistical feature analyzer 205, at first the straight lines perpendicular to the time axis are detected from extracted features, which are represented as two-dimensional images having the time axis and the space axis, by the camcorder on/off detecting means so as to extract camcorder on/off information. More particularly, the x-t spatio-temporal projection images are expressed by F(x, t) and the y-t spatio-temporal projection images are expressed by F(y, t). It is supposed that, if the value C to be calculated from following Eq.(1) is in excess of a predetermined threshold value, on/off of the camcorder is generated at the time t.

$$C(t)=\text{sum}(F(x,\ t))dx+\text{sum}(F(y,\ t))dy \qquad (1)$$

Next, extraction of camcorder operating information is carried out. The camcorder operating information to be extracted is shown in FIG. 4. Camcorder operation consists of seven basic operations and their combination operations. As the basic operations, there are fix (operation for setting-up the camcorder), pan 401 (operation for swing the camcorder horizontally), zoom 402 (operation for magnifying/reducing the subject by changing an angle of view), tilt 403 (operation for swing the camcorder vertically), track 404 (operation for moving the camcorder horizontally), boom 405 (operation for moving the camcorder vertically), and dolly 406 (operation for moving the camcorder back and forth). In other words, the fix is still, the pan and the tilt are changes along an optical axis when a camcorder projection center is fixed, the zoom is change in the angle of view, and the track, the boom and the dolly are operations which are followed by change in the position of the camcorder projection center respectively. According to change in the position of the camcorder projection center, the track, the boom, and the dolly are operations including three-dimensional placement information of the subject in the motion of the videos. The motion of the videos picked up by the track, the boom, and the dolly appears as a quick motion if the subject is relatively close to the camcorder, but it appears as a slow motion if the subject is relatively remote to the camcorder.

The x-t spatio-temporal projection images calculated by the above method are expressed by F(x, t). The x-t spatio-temporal projection images are a function of the space x and the time t. A spatial distribution of the x-t spatio-temporal projection images at the time to is expressed by $F(x, t_0)$ and similarly the spatial distribution of the x-t spatio-temporal projection images at the time $t_1$ is expressed by $F(x, t_1)$. Also, global motion parameters calculated hereinafter are expressed by a, b, and c, wherein a denotes a zoom parameter of the camcorder operation, b denotes a pan parameter thereof, and c denotes a tilt parameter thereof. An approach for calculating the parameters for the camcorder operation will be shown hereinunder.

Assume that the global motions are included in the generated x-t spatio-temporal projection images, a following equation can be satisfied between $F(x, t_0)$ and $F(x, t_1)$.

$$F(x\%,\ t_1)=F(ax+b,\ t_0)$$

Similarly, for the x-t spatio-temporal projection images, $$F(y\%,\ t_1)=F(ay+b,\ t_0)$$

can be satisfied. At first, a correlation between x% and x and a correlation between y% and y in the above are executed by a correlating means. The processing of the correlation is shown in FIG. 5.

Figure 5:
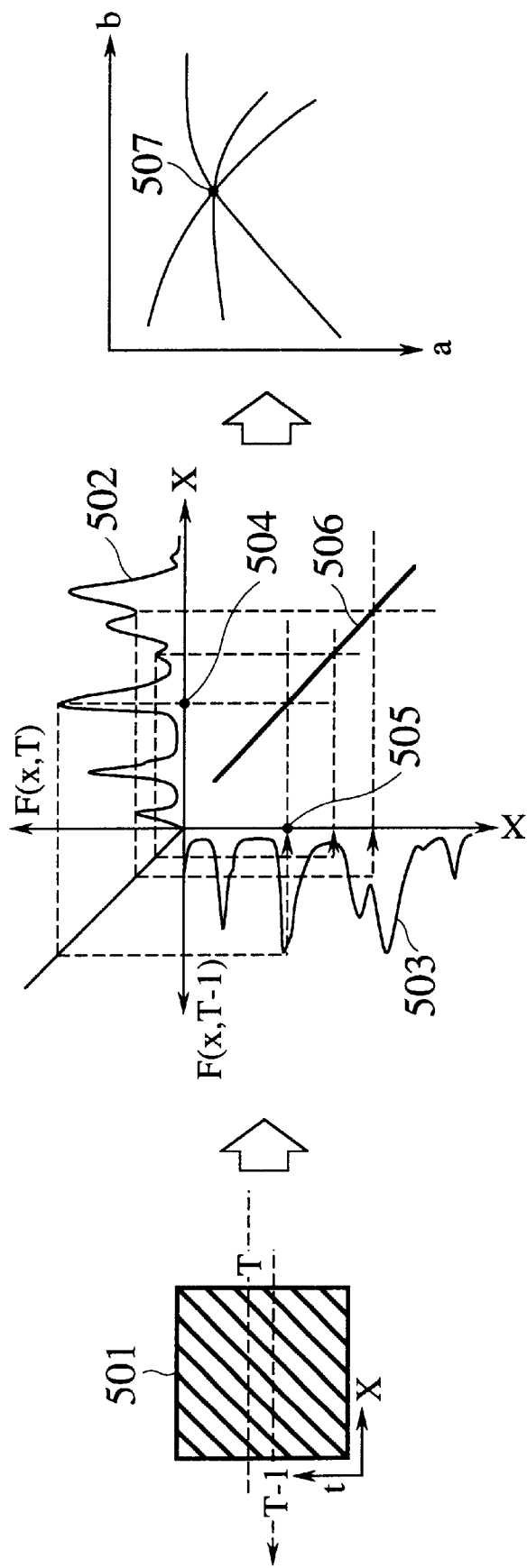
FIG. 5 is a view showing an algorithm for extracting the camcorder operating information in the above embodiment.

501 in FIG. 5 denotes the x-t spatio-temporal projection images, 502 denotes the spatial distribution F(x, T) at the time T, and 503 denotes the spatial distribution F(x, T−1) at the time T−1. A coordinate value 504 is correlated as shown in FIG. 5 to thus calculate a corresponding coordinate 505. In addition to this calculation method, it is possible to correlate the coordinates by calculating the correlation function every infinitesimal range. 504 and 505 being correlated with each other denote any coordinate values and a relationship between these coordinate values can be given by a straight line shown by 506. The gradient of this straight line denotes the zoom parameter a and the intercept thereof denotes the pan parameter b.

Subsequently, by using the spatial coordinate values which are correlated as above, camcorder operation parameters are calculated by a camcorder operation parameter calculating means. In particular, in order to calculate the parameters a and b on the straight line, the maximum value 507 of the projective space can be extracted by projecting (voting) onto the parameter spaces according to the following equation by use of the correlated spatial coordinate values, so that calculation of the parameters a and b can be effected. In general, this transformation has been called the Hough transformation (P.V.C. Hough; "Method and Means for Recognizing Complex Patterns", U.S. Pat. No. 306,954, 1962). If any correlated coordinates are represented by x% and x, the relationship between the parameters a and b can be given by $$b = x\% \cdot \cos(a) + x \sin(a)$$

The Hough transformation has been established as a method which can normally estimate a straight line constructed by these points from a plurality of points.

One point of the image space represents one curved line in the Hough space (projective space) and coordinate values of an intersecting point 507 of plural curved lines represent the gradient and the intercept of a straight line to be extracted. According to the computer, the gradient and the intercept of the straight line to be extracted can be calculated as the coordinate values indicating the maximum vote when the straight line is voted onto the projective space. The parameters can be calculated by voting plural sets of correlated coordinate values onto the projective space respectively.

Similarly, a tilt parameter c can be calculated from the y-t spatio-temporal projection images. Also, since the spatio-temporal projection (integration) images to which the operation including three-dimensional information has been applied are also equivalent microscopically (partially) to the images to which the operation without three-dimensional operation has been applied, such images can be processed by applying the above process partially (block by block). The above is the configuration of the camcorder operation condition detector 103 and flow of the processes therein.

Next, returning to FIG. 1, in a video splitter 104, the videos are split into shots based on the camcorder on/off information calculated by the camcorder operation condition detector 103. It may be considered that, in the shots split according to the on/off of the camcorder, the images in the same shot includes the same continuous spatial information.

Figures 6, 7:
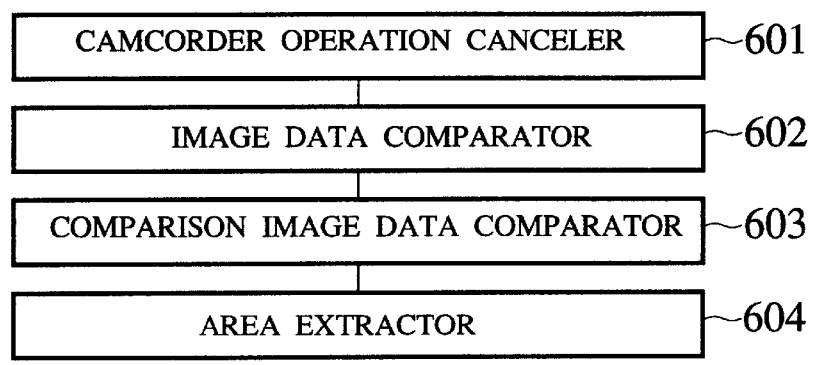
FIG. 6 is a view showing a configuration of a subject/background separator in the above embodiment and a flow of processes carried out therein.
FIG. 7 is a view showing an example of binarization process in the above embodiment.

Then, in a subject/background separator 105, separation of the subject and the background is carried out. A configuration of the subject/background separator 105 is shown in FIG. 6. Configurations of the constituent elements 601 to 604 in the subject/background separator 105 and a flow of processes carried out by these elements will be explained in detail hereunder.

First, in a camcorder operation canceler 601, the camcorder operation is canceled from the image data by a video frame deforming means based on the camcorder operation information. The image data are changed/displaced according to the change/displacement caused by the camcorder operation between adjacent image data. The adjacent image data are assumed as F(x, y, t) and F(x, y, t+1). If A (where A is a matrix) is used as the camcorder operation, a following relationship can be derived between the adjacent image data.

$$F(x, y, t+1) = A\ F(x, y, t)$$

Cancellation of the camcorder operation can be expressed by $$F(x, y, t) = A^{-1}\ F(x, y, t+1)$$

Then, in an image data comparator 602, the comparison process between the adjacent images from which the camcorder operation has been canceled in the above can be effected by a difference processing means. The process executed here is the comparison process effected between the images from which the camcorder operation has been canceled, and absolute difference values of information such as brightness, color, etc. between the images, etc. can be calculated. The background can be subtracted by the comparison process, so that variation only in the motion of the subject can be extracted as the difference against the background.

Then, in a comparison image data comparator 603, comparison is effected between the adjacent comparison image data. The process executed here is such a comparison operation that the product between the images or the smaller value between the images is selected as the comparison image value. According to a series of processes, areas of the subject (moving object) in the middle images of three sheets of continuous image data can be enhanced.

Then, in an area extractor 604, the binarization process of the enhanced area of the subject is effected by a binarization processing means. The binarization process is carried out by using a previously assigned threshold value S in the following conditions. Assume that the comparison data images are f (x, y) and the binarized images are F (x, y).

$$F(x, y) = 1: \text{if } f(x, y) \geq S$$

$$F(x, y) = 1: \text{if } f(x, y) < S$$

An example of the binarization process is shown in FIG. 7. 701 denotes the comparison data images and 702 denotes the binarized images. Such a situation is assumed that a threshold value is set to 9.

Figure 8:
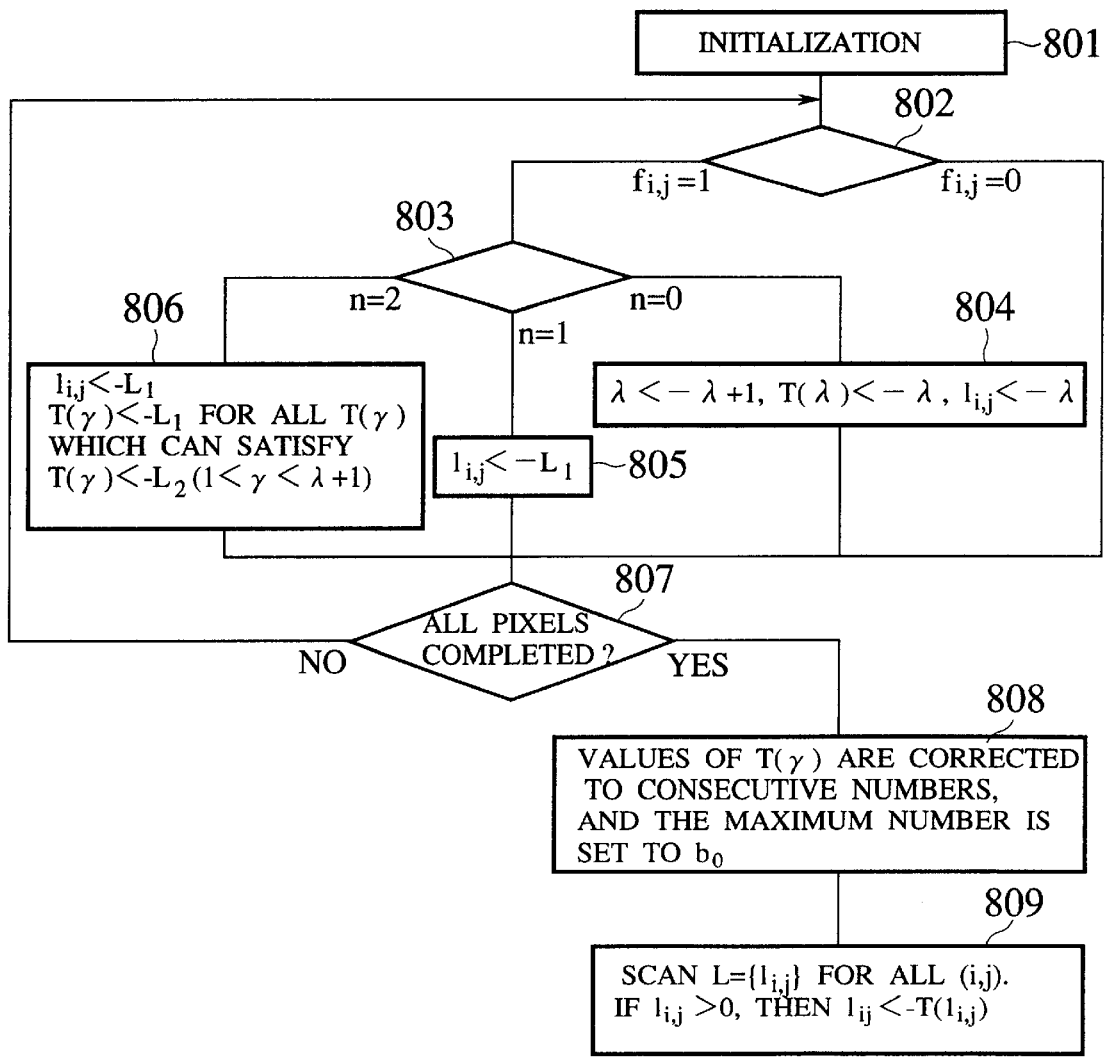
FIG. 8 is a flowchart showing a labeling process in the above embodiment.
Figure 9:
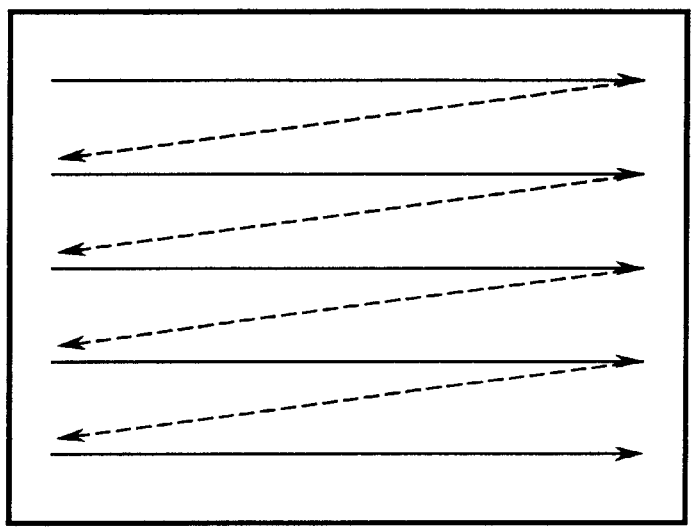
FIG. 9 is a view showing the image scanning sequence in the above embodiment.
Figure 10:
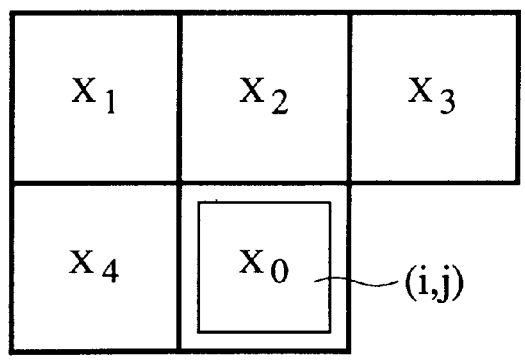
FIG. 10 is a view showing an object pixel and scanned pixels in the above embodiment.

Subsequently, labeling of the binarized images F(x, y) can be effected by a labeling means. An algorithm of the labeling is shown in FIG. 8. The binarized images F(x, y) is expressed by F={$F_{i,j}$} and the labeled images is expressed by L={$l_{i,j}$}. $l_{i,j}$ are positive integers representing the labels of respective connecting components. Also, l's are variables representing the connecting component numbers and T(i) represent label tables. In an initialization 801, l=1 is set and label scanning is started from the pixel(2, 2). The current pixel is set to (i, j) and it is decided in 802 whether $f_{i,j}$ is 1 or 0. If $f_{i,j}$=1, then the process advances to 803. If $f_{i,j}$=0, then $l_{i,j}$=0 is set and the process advances to 807. In the scanning method shown in FIG. 9, the current pixel $x_0=(i, j)$ and the neighboring operated pixels are represented as shown in FIG. 10, and the label of $x_p$ (value of the image L) is assumed as $l_p$ (p=1, 2, 3, 4). In 803, it is assumed that different positive values of n type exist in $\{T(l_p), l_p \neq 0, p=1, 2, 3, 4\}$ and they are set as $L_1, L_2, \ldots, L_n$ in increasing order. The process goes to 804 if n=0, the process goes to 805 if n=1, and the process goes to 806 if n=2. After respective processes, the process goes to 807. In 807, it is decided whether or not all pixels have been completed. If all pixels have been completed, the processes in 808, 809 are carried out and then the labeling is ended.

Then, physical feature properties can be calculated from the labeled area by a physical feature calculating means. The physical features calculated herein are brightness, color distribution, texture, and the like. Then, predetermined feature properties and the feature properties calculated in the label area are compared and collated by a collating means to decide the subject area. Then, the background area can be separated by a background extracting means by subtracting the subject area extracted in the above from the frame images.

The above explanations are the configuration of the subject/background separator 105 and the flow of process therein.

Next, returning to FIG. 1, in a subject motion information extractor 106, physical feature properties calculated in the area which has been extracted every frame image are compared between adjacent frames by the collating means and then collated with the predetermined conditions assigned to comparing properties, so that the time correlation is executed such that the area corresponding to the conditions is regarded as the area including similar physical features, i.e., the area caused by the same subject. Such correlation information is the motion information of the subject.

Figure 11:
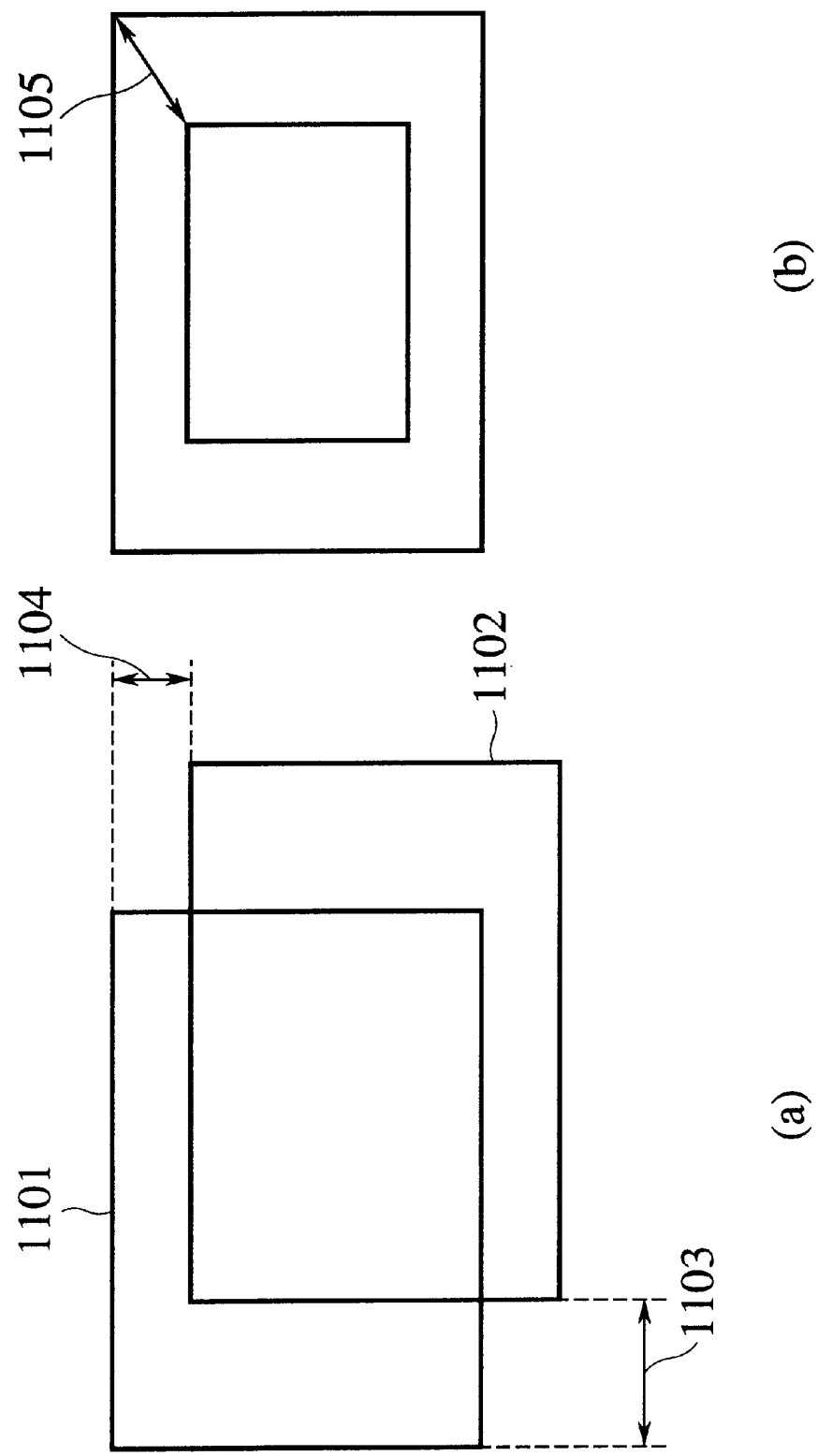
FIG. 11 is a view showing a method of resynthesizing a video taken space based on scan of the camcorder in the above embodiment.

In the meanwhile, in a video taken space resynthesizer 107, the backgrounds separated by the subject/background separator are superposed as a continuous space by a space superposing means by deforming/displacing the image frames based on the camcorder operation information calculated by the camcorder operation condition detector 103 to resynthesize a broad video taken space which exceeds the frame. Behaviors of the resynthesis is shown in FIG. 11. In (a) of FIG. 11, 1101 and 1102 are frame images which are continuous in time. If the videos are picked up by the pan operation of the camcorder, 1102 can be synthesized by shifting from 1101 by an amount of 1103 (a pan operating amount per frame). Similarly, in the case of the tilt operation of the camcorder, 1102 can be synthesized by shifting by an amount of 1104 (a tilt operating amount per frame). In the case of the zoom operation of the camcorder, as shown in (b) of FIG. 11, the images can be synthesized by magnifying/reducing the size thereof according to a zoom amount 1105. The background generated by this synthesized method is a so-called panoramic space and has the strain peculiar to the panoramic space. This strain is equivalent to a strain generated when the images are subjected to a cylindrical transformation.

Figure 12:
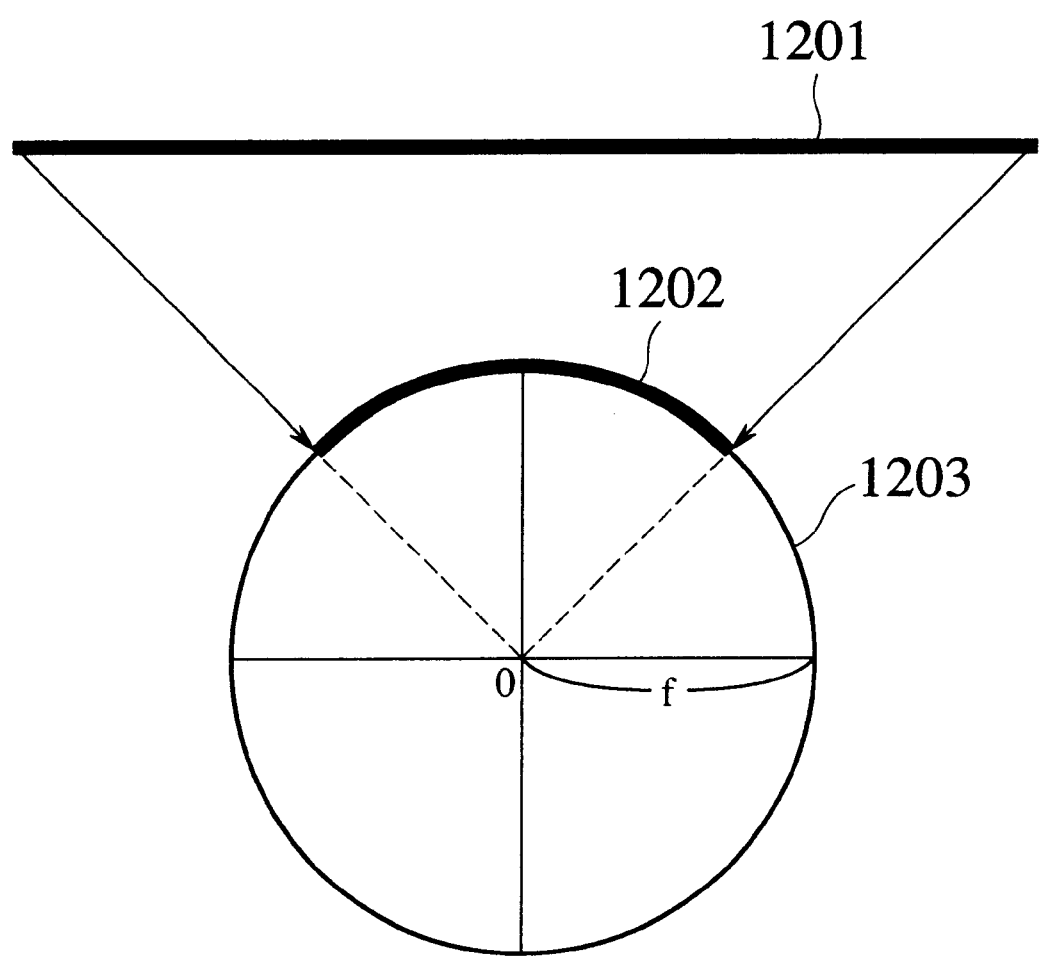
FIG. 12 is a view showing a cylindrical transformation.

Then, in a shot-to-shot relation calculator 108, shot-to-shot relation information can be calculated from the resynthesized video taken space every shot by a video taken space transforming means after the video taken spaces have been transformed so as to coincide their sizes and positions between the video taken spaces. The calculated information are information as for the shot space. Respective spatial arrangement relationships recorded in the correlating shots are used as shot-to-shot relation information. The shot-to-shot relation can be calculated by comparing the panoramic spaces resynthesized by the video taken space resynthesizer 107. The panoramic spaces generated from the videos which have been picked up at the same focal length include the same strain caused by the cylindrical transformation. Deformation of the cylindrical transformation is shown in FIG. 12. A line 1201 on the three-dimensional space can be transformed into 1202 on a circular cylinder 1203 by the cylindrical transformation. A point O in FIG. 12 is a projection center of the camcorder and the image surface is on the circular cylinder 1203. A size of the circular cylinder can be decided uniquely by the size of the focal length f at the time of image pick-up. According to this, the panoramic spaces generated from the videos picked up at the same focal length have the same strain in the cylindrical transformation. The relationship between the panoramic spaces generated from the videos picked up at the same focal length can be detected by calculating spatial parallel displacement amounts of these images. The relationship can be calculated by matching using one panoramic image as the template and the correlation function coefficient. Upon calculation, such matching can be effected stably by defining the estimation function newly from the correlation of overlapped portions and the overlapped areas. The matching must be effected with regard to the circular cylinder strain to correlate the images which have different focal lengths. If the matching is effected by changing the focal length little by little on the basis of one image, the relation can be calculated. For the videos which are picked up without the camcorder operation, the relation can be calculated if the matching is effected by magnifying/reducing the size of the images.

The calculated camcorder on/off information, the camcorder operation information, the subject information, the subject motion information, the resynthesized background information, and the shot-to-shot relation information can be managed/stored for a plurality of videos in a video structure information managing/storing portion 109. In the prior art, the videos have been managed in the storing device as files or changes of RGB signals in time. The management at the signal level has been effective for mechanical process, transmission, storage, and display. In the multimedia generation in which the videos can be treated with the computer, treatment of the videos has been changed from simple processing, storing, displaying, etc. of the signal in the prior art to high degree treatments of the videos such as search from the large amount of stored video database, editing, working, etc. In order to enable such high degree treatment of the videos, the videos must be managed as information at a more detailed level of the video contents rather than the signal level. The above extracted information are information obtained at such level and then, if the videos are expressed and managed as such information, higher degree treatment which is totally different from the videos which are represented only by time changing RGB signals can be achieved. Unlike mere time change of the signals, this representation on which the contents of the videos are reflected can also be considered as semantic representation as with the time and the space of the videos. High degree treatment of the videos which are intuitive and easy for human beings to understand can be achieved by storing/managing spatio-temporally such new representation of the videos.

Structural information of the extracted videos and video data can be stored via data compression. Reduction of the storing space and transmission/reception of data via the network can be accomplished by the data compression. Out of the video structural information, the information which change according to the time as the variable can be compressed by using the reciprocal coding such as Huffman coding etc. Spatial information as with the images (e.g., extracted subject images, resynthesized background images, etc.) can be compressed as still images by using the nonreciprocal coding. A representative approach of the nonreciprocal coding is the JPEG coding. The 320×240 images which are resynthesized from the videos picked up by swinging the camcorder horizontally throughout 360 degree according to the present invention can include information of about 5 Mbyte. Such images can then be compressed into data of about 500 Kbyte since a compression efficiency of 1/10 can be estimated by the JPEG coding. If the Internet, or the like are used at present, it is impossible to transmit data of about 5 Mbyte information because of time restriction, but it is possible to transmit data of about 500 Kbyte in practical use. Also, the images of the subject which changes in time can be compressed into about 1/10 to 1/20 by using the coding such as H261 coding, MPEG coding, or the like which is the nonreciprocal coding. In the event that structured videos are transmitted via the thin line (line having a low information transmission rate) such as the Internet, network employment, time shortening, and good interaction response can be attained by transmitting the lowest minimum information such as the background images which are JPEG-compressed as the images and the subject image information which are also JPEG-compressed as the still images in which the time information are developed in the space (for example, stroboscopic images in which the subject is developed on the background, etc.) to respond to the user's request. As to the embodiment shown in FIG. 1, an image structure information transmitter/receiver 114 transmits and receives such a minimum information.

Then, in a resynthesizer 110, the information which are managed in the video structure information managing/storing portion 109 are resynthesized in response to the request issued from a user input portion 112 or in compliance with predetermined conditions or in compliance with both the user's request and the predetermined conditions. Semantic video filtering can be executed. The videos of the background only, the subject only, or the like can be generated. The videos which are represented as information of the space only can be generated by developing the time information in the space from the video information of the time and the space. As such example, there are videos in which the subject is represented stroboscopically in the space which is panoramically developed as above. In the prior art, only the stroboscopic representation being sampled on a time base has been able to be achieved, but according to the present invention, the stroboscopic representation being sampled on a space base has been able to be achieved as well as the stroboscopic representation being sampled on a time base.

Figure 13:
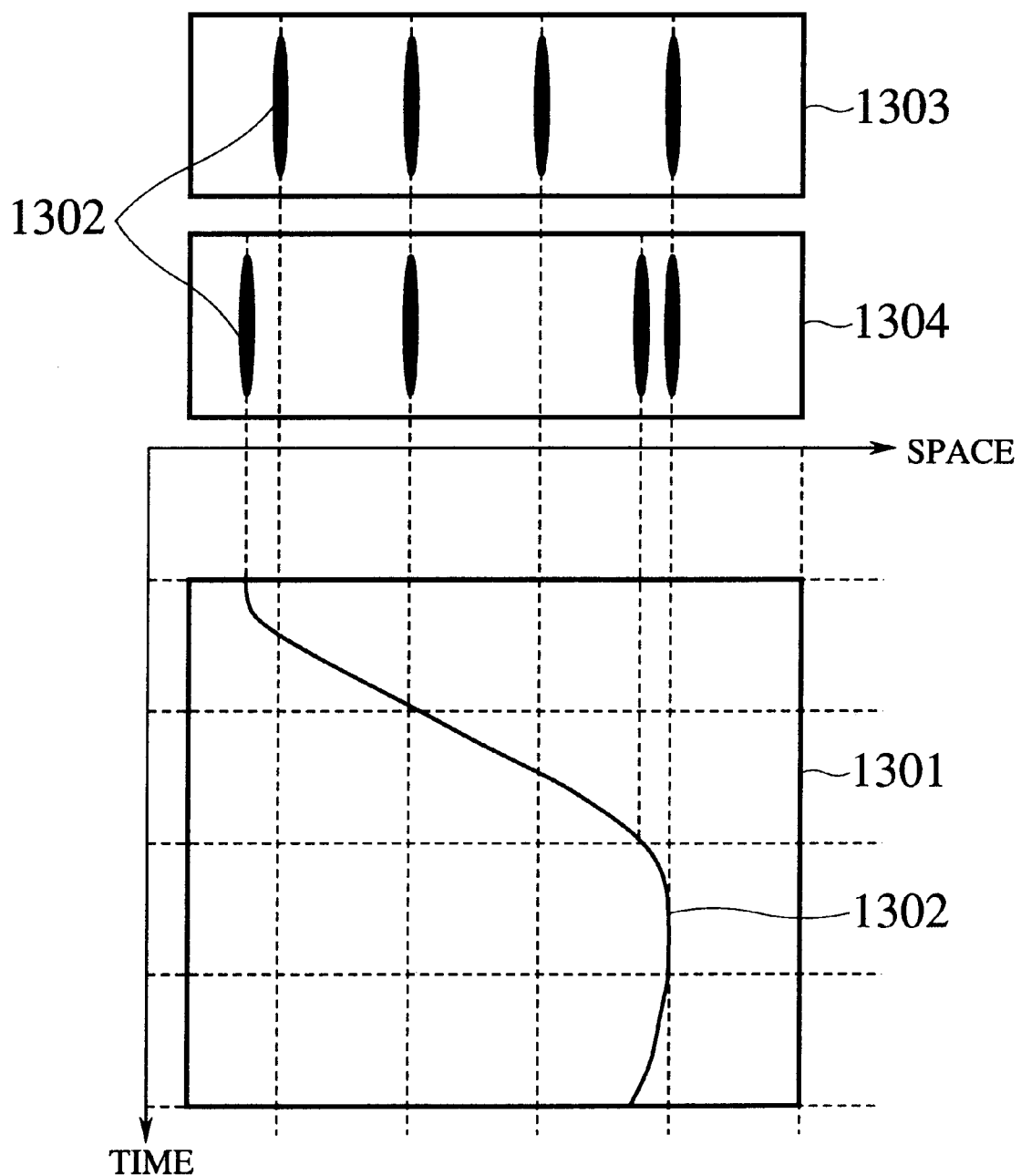
FIG. 13 is a view showing stroboscopic representation according to a spatio-temporal sampling in the above embodiment.

A stroboscopic representation according to a spatio-temporal sampling is shown in FIG. 13. 1301 denotes resynthesized panoramic space. 1302 denotes the subject. 1303 denotes the stroboscopic representation according to the spatial sampling and 1304 denotes the stroboscopic representation according to the time sampling. The arrangement of the subject also represents the velocity of the subject in 1304, while 1303 represents change of the subject in the space. A plurality of subjects which exist in different shots can be synthesized on one background by use of the shot-to-shot relation information. For example, first the subject (player A) picked up by the shot A can be displayed as stroboscopic representation on the panoramic space and then the subject (player B) picked up by the shot B can be displayed as the moving picture to overlap with the player A on the stroboscopic representation. The shot A and the shot B employed herein have spatially the common space. The enhancement of the videos makes it easy for the user to grasp intuitively and visually differences in form between the good player and the bad player, etc.

In the resynthesizer 110, various representation can be implemented in response to the user's request issued from the user input portion 112. Based on the videos displayed in a display unit 111, the user can feed back the representation responding to the user's request via the user input portion 112. In addition, digital/analogue outputs can be output from an output portion 113. The digital output can be supplied to an external printer, a personal computer, etc., while the analogue output are Video signal outputs supplied to a monitor, etc. Such output portion 113 may be provided if necessary.

With the above, the present invention has been explained concretely according to the embodiment. But the present invention is not limited to the embodiment and it is needless to say that various modifications can be applied in the range without departing from the scope and spirit of the invention.

Industrial Applicability

As stated above, according to the present invention, video data are read, then saved image data string are read out, then camcorder operation condition information including camcorder on/off information and camcorder operating information are detected, then videos are split into respective shots based on the camcorder on/off information, then the subject and the background are separated frame by frame by using the camcorder operating information and physical feature properties, then subject motion information are extracted by correlating separated subject information between frames, then the video taken spaces are resynthesized based on the camcorder operating information and the background every frame, then spatial shot-to-shot relations are calculated between a plurality of pick-up spaces which are resynthesized based on a plurality of shots respectively, and above resultant information are managed/stored. As a result, spatio-temporal integration of a plurality of videos can be achieved which enables the spatio-temporal enhancement of the plurality of videos, spatio-temporal and integrated management, representation, and operation.

In addition, since one or plural video taken spaces and one or plural subjects are resynthesized, displayed, or output to an external device in analogue/digital manners based on the above managed and stored information in compliance with the predetermined conditions and the user's request, the users can acquire information of plural videos from a plurality of videos picking up the same space simultaneously, intuitively, and effectively in response to their interest and object in their own style.

What is claimed is:

1. A system for spatio-temporally integrating/managing a plurality of videos, comprising:

an image data string memory portion for reading video data to save video data as data string;

a camcorder operation condition detecting portion for reading the data string from the image data string memory portion and detecting camcorder operation condition information including camcorder on/off information and camcorder operating information;

a video splitting portion for splitting videos of the data string into respective shots based on the camcorder on/off information;

a subject/background separating portion for separating a subject and a background every frame of the videos by using the camcorder operating information and physical feature properties;

a subject motion information extracting portion for correlating subject information separated every frame between frames;

a video taken space resynthesizing portion for resynthesizing video taken spaces from which the videos are picked up, based on the camcorder operating information and the background separated every frame;

a shot-to-shot relation calculating portion for calculating spatial shot-to-shot relations between a plurality of video taken spaces, which are resynthesized by the video taken space resynthesizing portion respectively, based on a plurality of shots being separated; and a video structure information managing/storing portion for managing/storing separated subject information, correlated subject information, the camcorder operation condition information, background information, and shot-to-shot relation information.

2. A system for spatio-temporally integrating/managing a plurality of videos according to claim 1, further comprising:

a video structure information transmitter/receiver for transmitting or receiving all or a part of extracted subject information, the camcorder operation condition information, the background information, the shot-to-shot relation information, and the video data.

3. A system for spatio-temporally integrating/managing a plurality of videos according to claim 2, further comprising:

a resynthesizer for resynthesizing one or plural video taken spaces and one or plural subjects based on information stored/managed in the video structure information managing/storing portion in compliance with one or both of predetermined conditions and user's requests;

a display unit for displaying resynthesized videos in the resynthesizer;

a user input portion for inputting the user's requests for resynthesis based on the videos which are displayed on the display unit; and an output portion for outputting the videos which are displayed on the display unit to an external device in a digital or analogue manner.

4. A system for spatio-temporally integrating/managing a plurality of videos according to claim 1, wherein the camcorder operation condition detecting portion comprises, a linear component calculating portion for calculating respective horizontal/vertical linear components of image frames read from the image data string memory portion, an image data rearrangement portion for rearranging spatio-temporal placements which are occupied by the images including calculated respective horizontal/vertical linear components, a video information filter processing portion for applying filter process to the image data derived by rearrangement, a feature extracting portion for extracting features from results of the filter process, and a statistical feature analyzing portion for detecting the camcorder on/off information and the camcorder operation information by analyzing statistically the extracted features.

5. A system for spatio-temporally integrating/managing a plurality of videos according to claim 4, wherein the image data rearrangement portion comprises an image data string rearrangement means for rearranging image data string into plural sheets of spatio-temporal sectional images which include normals of the image and a time axis.

6. A system for spatio-temporally integrating/managing a plurality of videos according to claim 4, wherein the video information filter portion comprises a segment detecting means for detecting edges or lines of the video information of rearranged image data.

7. A system for spatio-temporally integrating/managing a plurality of videos according to claim 6, wherein the feature extracting portion comprises an integration means for adding information as for detected edges or lines along a normal direction of the images.

8. A system for spatio-temporally integrating/managing a plurality of videos according to claim 4, wherein the statistical feature analyzing portion comprises a camcorder on/off detecting means for detecting straight lines of extracted features, which are represented as two-dimensional images having the time axis and the space axis, perpendicular to the time axis, to calculate the camcorder on/off information.

9. A system for spatio-temporally integrating/managing a plurality of videos according to claim 4, wherein the statistical feature analyzing portion comprises, a correlating means for correlating space coordinates by comparing spatial distributions at any two moments of extracted features which are represented on two-dimensional images having the time axis and the space axis, and a camcorder operation parameter calculating means for calculating camcorder operation parameters by processing statistically correlated space coordinates.

10. A system for spatio-temporally integrating/managing a plurality of videos according to claim 1, wherein the subject/background separating portion comprises, a camcorder operation canceling portion for canceling the camcorder operation between adjacent image data based on the camcorder operation information detected by the camcorder operation condition detector, an image data comparator for comparing the image data from which the camcorder operation information are canceled, a comparison image data comparator for comparing adjacent comparison image data, and an area extracting portion for extracting an subject area from comparison data which are calculated by the comparison image data comparator.

11. A system for spatio-temporally integrating/managing a plurality of videos according to claim 10, wherein the camcorder operation canceling portion comprises a video frame deforming means for deforming/displacing adjacent image frames based on the camcorder operation information to cancel change/displacement caused by the camcorder operation.

12. A system for spatio-temporally integrating/managing a plurality of videos according to claim 10, wherein the image data comparator comprises a difference processing means for executing difference process of brightness and color information between adjacent image data from which the camcorder operations are canceled.

13. A system for spatio-temporally integrating/managing a plurality of videos according to claim 10, wherein the area extracting portion comprises, a binarization processing means for carrying out binarization process of the comparison data, a labeling means for carrying out labeling binarization data which have been subjected to the binarization process, a physical feature calculating means for calculating physical features in a labeled area, and a collating means for collating calculated physical features with predetermined conditions to extract the subject area.

14. A system for spatio-temporally integrating/managing a plurality of videos according to claim 13, wherein the subject/background separating portion comprises a background extracting means for extracting the background by subtracting the subject area per frame extracted by the area extracting portion from the frame image.

15. A system for spatio-temporally integrating/managing a plurality of videos according to claim 13, wherein the subject motion information extracting portion comprises a collating means for collating physical features of adjacent areas in time of the subject areas extracted frame by frame by the area extracting portion with predetermined conditions to correspond the subject information between the frames.

16. A system for spatio-temporally integrating/managing a plurality of videos according to claim 1, wherein the video taken space resynthesizing portion comprises a space superposing means for superposing adjacent image frames into a continuous video taken space by deforming/displacing the adjacent image frames based on the camcorder operation information detected by the camcorder operation condition detecting portion.

17. A system for spatio-temporally integrating/managing a plurality of videos according to claim 1, wherein the shot-to-shot relation calculating portion comprises a video taken space transforming means for transforming a video taken space per shot generated by the video taken space resynthesizing portion so as to make size and positions thereof equal between video taken spaces.

18. A system for spatio-temporally integrating/managing a plurality of videos according to claim 1, wherein the video structure information managing/storing portion comprises a means for spatio-temporally managing/storing by data-compressing extracted subject information, the camcorder operation condition information, the background information, and the shot-to-shot relation information, video data, and all or a part of video taken spaces of a plurality of videos which are resynthesized by using the camcorder operation condition information, the background information, and the shot-to-shot relation information, the video data.

19. A system for spatio-temporally integrating/managing a plurality of videos according to claim 18, wherein the video structure information managing/storing portion comprises, a means for data-compressing the extracted subject information as the still images by developing the extracted subject information into the space, and a means for data-compressing, as the still images, video taken spaces of a plurality of videos which are resynthesized.

20. A method of spatio-temporally integrating/managing a plurality of videos, comprising:

an image data string saving step of reading video data to save the video data as data string in an image data string memory portion;

a camcorder operation condition detecting step of reading the data string from the image data string memory portion and detecting camcorder operation condition information including camcorder on/off information and camcorder operating information;

a video splitting step of splitting videos of the data string into respective shots based on the camcorder on/off information;

a subject/background separating step of separating a subject and a background every frame of the videos by using the camcorder operating information and physical feature properties;

a subject motion information extracting step of correlating subject information separated every frame between frames;

a video taken space resynthesizing step of resynthesizing video taken spaces from which the videos are picked up, based on the camcorder operating information and the background separated every frame;

a shot-to-shot relation calculating step of calculating spatial shot-to-shot relations between a plurality of video taken spaces, which are resynthesized by the video taken space resynthesizing step respectively, based on a plurality of shots being separated; and a video structure information managing/storing step of managing/storing separated subject information, correlated subject information, the camcorder operation condition information, background information, and shot-to-shot relation information.

21. A method of spatio-temporally integrating/managing a plurality of videos according to claim 20, further comprising:

a video structure information transmitting/receiving step of transmitting or receiving all or a part of extracted subject information, the camcorder operation condition information, the background information, the shot-to-shot relation information, and the video data.

22. A method of spatio-temporally integrating/managing a plurality of videos according to claim 20, further comprising, after the video structure information managing/storing step:

a resynthesizing step of resynthesizing one or plural video taken spaces and one or plural subjects based on stored/managed information in compliance with one or both of predetermined conditions and user's requests; and a display or outputting of displaying or outputting videos resynthesized by the resynthesizing step.

23. A method of spatio-temporally integrating/managing a plurality of videos according to claim 20, wherein the camcorder operation condition detecting step comprises, a linear component calculating step of calculating respective horizontal/vertical linear components of image frames read by the image data string memory step, an image data rearrangement step of rearranging spatio-temporal placements which are occupied by the images including calculated respective horizontal/vertical linear components, a video information filter processing of applying filter process to the image data derived by rearrangement, a feature extracting step of extracting features from results of the filter process, and a statistical feature analyzing step of detecting the camcorder on/off information and the camcorder operation information by analyzing statistically the extracted features.

24. A method of spatio-temporally integrating/managing a plurality of videos according to claim 23, wherein the image data rearrangement step rearranges image data string into plural sheets of spatio-temporal sectional images which include normals of the image and a time axis.

25. A method of spatio-temporally integrating/managing a plurality of videos according to claim 23, wherein the video information filter step detects edges or lines of the video information of image data obtained by rearrangement.

26. A method of spatio-temporally integrating/managing a plurality of videos according to claim 25, wherein the feature extracting step extracts features by adding information as for detected edges or lines along a normal direction of the images.

27. A method of spatio-temporally integrating/managing a plurality of videos according to claim 23, wherein the statistical feature analyzing step detects straight lines of extracted features, which are represented as two-dimensional images having the time axis and the space axis, perpendicular to the time axis, to calculate the camcorder on/off information.

28. A method of spatio-temporally integrating/managing a plurality of videos according to claim 23, wherein the statistical feature analyzing step comprises, a correlating step of correlating space coordinates by comparing spatial distributions at any two moments of extracted features which are represented on two-dimensional images having the time axis and the space axis, and a camcorder operation parameter calculating step of calculating camcorder operation parameters by processing statistically correlated space coordinates.

29. A method of spatio-temporally integrating/managing a plurality of videos according to claim 20, wherein the subject/background separating step comprises, a camcorder operation canceling step of canceling the camcorder operation between adjacent image data based on the camcorder operation information detected by the camcorder operation condition detecting step, an image data comparing step of comparing the image data from which the camcorder operation information are canceled, a comparison image data comparing step of comparing adjacent comparison image data, and an area extracting step of extracting an subject area from comparison data which are calculated by the comparison image data comparing step.

30. A method of spatio-temporally integrating/managing a plurality of videos according to claim 29, wherein the camcorder operation canceling step deforms/displaces adjacent image frames based on the camcorder operation information to cancel change/displacement caused by the camcorder operation.

31. A method of spatio-temporally integrating/managing a plurality of videos according to claim 29, wherein the image data comparing step executes difference process of brightness and color information between adjacent image data from which the camcorder operations are canceled.

32. A method of spatio-temporally integrating/managing a plurality of videos according to claim 29, wherein the area extracting step comprises, a binarization processing step of carrying out binarization process of the comparison data, a labeling step of carrying out labeling binarization data which have been subjected to the binarization process, a physical feature calculating step of calculating physical features in a labeled area, and a collating step of collating calculated physical features with predetermined conditions to extract the subject area.

33. A method of spatio-temporally integrating/managing a plurality of videos according to claim 32, wherein the subject/background separating step extracts the background by subtracting the subject area per frame extracted by the area extracting step from the frame image.

34. A method of spatio-temporally integrating/managing a plurality of videos according to claim 32, wherein the subject motion information extracting step collates physical features of adjacent areas in time of the subject areas extracted frame by frame by the area extracting step with predetermined conditions to correlate the subject information between the frames.

35. A method of spatio-temporally integrating/managing a plurality of videos according to claim 20, wherein the video taken space resynthesizing step superposes adjacent image frames into a continuous video taken space by deforming/displacing the adjacent image frames based on the camcorder operation information detected by the camcorder operation condition detecting portion.

36. A method of spatio-temporally integrating/managing a plurality of videos according to claim 20, wherein the shot-to-shot relation calculating step transforms a video taken space per shot generated by the video taken space resynthesizing portion so as to make size and positions thereof equal between video taken spaces.

37. A method of spatio-temporally integrating/managing a plurality of videos according to claim 20, wherein the video structure information managing/storing step spatio-temporally manages/stores by data-compressing extracted subject information, the camcorder operation condition information, the background information, and the shot-to-shot relation information, video data, and all or a part of video taken spaces of a plurality of videos which are resynthesized by using the camcorder operation condition information, the background information, and the shot-to-shot relation information, the video data.

38. A method of spatio-temporally integrating/managing a plurality of videos according to claim 37, wherein the video structure information managing/storing step data-compresses the extracted subject information as the still images by developing the extracted subject information into the space, and data-compresses, as the still images, video taken spaces of a plurality of videos which are resynthesized.

39. A computer readable recording medium for recording a program for spatio-temporally integrating/managing a plurality of videos, comprising:

an image data string saving step of reading video data to save the video data as data string in an image data string memory portion;

a camcorder operation condition detecting step of reading the data string from the image data string memory portion and detecting camcorder operation condition information including camcorder on/off information and camcorder operating information;

a video splitting step of splitting videos of the data string into respective shots based on the camcorder on/off information;

a subject/background separating step of separating a subject and a background every frame of the videos by using the camcorder operating information and physical feature properties;

a subject motion information extracting step of correlating subject information separated every frame between frames;

a video taken space resynthesizing step of resynthesizing video taken spaces from which the videos are picked up, based on the camcorder operating information and the background separated every frame;

a shot-to-shot relation calculating step of calculating spatial shot-to-shot relations between a plurality of video taken spaces, which are resynthesized by the video taken space resynthesizing step respectively, based on a plurality of shots being separated; and a video structure information managing/storing step of managing/storing separated subject information, correlated subject information, the camcorder operation condition information, background information, and shot-to-shot relation information.

40. A computer readable recording medium for recording a program for spatio-temporally integrating/managing a plurality of videos according to claim 39, further comprising:

a video structure information transmitting/receiving step of transmitting or receiving all or a part of extracted subject information, the camcorder operation condition information, the background information, the shot-to-shot relation information, and the video data.

41. A computer readable recording medium for recording a program for spatio-temporally integrating/managing a plurality of videos according to claim 39, further comprising, after the video structure information managing/storing step:

a resynthesizing step of resynthesizing one or plural video taken spaces and one or plural subjects based on stored/managed information in compliance with one or both of predetermined conditions and user's requests; and a display or outputting of displaying or outputting videos resynthesized by the resynthesizing step.

42. A computer readable recording medium for recording a program for spatio-temporally integrating/managing a plurality of videos according to claim 39, wherein the camcorder operation condition detecting step comprises, a linear component calculating step of calculating respective horizontal/vertical linear components of image frames read by the image data string memory step, an image data rearrangement step of rearranging spatio-temporal placements which are occupied by the images including calculated respective horizontal/vertical linear components, a video information filter processing of applying filter process to the image data derived by rearrangement, a feature extracting step of extracting features from results of the filter process, and a statistical feature analyzing step of detecting the camcorder on/off information and the camcorder operation information by analyzing statistically the extracted features.

43. A computer readable recording medium for recording a program for spatio-temporally integrating/managing a plurality of videos according to claim 42, wherein the image data rearrangement step rearranges image data string into plural sheets of spatio-temporal sectional images which include normals of the image and a time axis.

44. A computer readable recording medium for recording a program for spatio-temporally integrating/managing a plurality of videos according to claim 42, wherein the video information filter step detects edges or lines of the video information of image data obtained by rearrangement.

45. A computer readable recording medium for recording a program for spatio-temporally integrating/managing a plurality of videos according to claim 44, wherein the feature extracting step extracts features by adding information as for detected edges or lines along a normal direction of the images.

46. A computer readable recording medium for recording a program for spatio-temporally integrating/managing a plurality of videos according to claim 42, wherein the statistical feature analyzing step detects straight lines of extracted features, which are represented as two-dimensional images having the time axis and the space axis, perpendicular to the time axis, to calculate the camcorder on/off information.

47. A computer readable recording medium for recording a program for spatio-temporally integrating/managing a plurality of videos according to claim 42, wherein the statistical feature analyzing step comprises, a correlating step of correlating space coordinates by comparing spatial distributions at any two moments of extracted features which are represented on two-dimensional images having the time axes and the space axis, and a camcorder operation parameter calculating step of calculating camcorder operation parameters by processing statistically correlated space coordinates.

48. A computer readable recording medium for recording a program for spatio-temporally integrating/managing a plurality of videos according to claim 39, wherein the subject/background separating step comprises, a camcorder operation canceling step of canceling the camcorder operation between adjacent image data based on the camcorder operation information detected by the camcorder operation condition detecting step, an image data comparing step of comparing the image data from which the camcorder operation information are canceled, a comparison image data comparing step of comparing adjacent comparison image data, and an area extracting step of extracting an subject area from comparison data which are calculated by the comparison image data comparing step.

49. A computer readable recording medium for recording a program for spatio-temporally integrating/managing a plurality of videos according to claim 48, wherein the camcorder operation canceling step deforms/displaces adjacent image frames based on the camcorder operation information to cancel change/displacement caused by the camcorder operation.

50. A computer readable recording medium for recording a program for spatio-temporally integrating/managing a plurality of videos according to claim 48, wherein the image data comparing step executes difference process of brightness and color information between adjacent image data from which the camcorder operations are canceled.

51. A computer readable recording medium for recording a program for spatio-temporally integrating/managing a plurality of videos according to claim 48, wherein the area extracting step comprises, a binarization processing step of carrying out binarization process of the comparison data, a labeling step of carrying out labeling binarization data which have been subjected to the binarization process, a physical feature calculating step of calculating physical features in a labeled area, and a collating step of collating calculated physical features with predetermined conditions to extract the subject area.

52. A computer readable recording medium for recording a program for spatio-temporally integrating/managing a plurality of videos according to claim 51, wherein the subject/background separating step extracts the background by subtracting the subject area per frame extracted by the area extracting step from the frame image.

53. A computer readable recording medium for recording a program for spatio-temporally integrating/managing a plurality of videos according to claim 51, wherein the subject motion information extracting step collates physical features of adjacent areas in time of the subject area extracted frame by frame by the area extracting step with predetermined conditions to correlate the subject information between the frames.

54. A computer readable recording medium for recording a program for spatio-temporally integrating/managing a plurality of videos according to claim 39, wherein the video taken space resynthesizing step superposes adjacent image frames into a continuous video taken space by deforming/displacing the adjacent image frames based on the camcorder operation information detected by the camcorder operation condition detecting portion.

55. A computer readable recording medium for recording a program for spatio-temporally integrating/managing a plurality of videos according to claim 39, wherein the shot-to-shot relation calculating step transforms a video taken space per shot generated by the video taken space resynthesizing portion so as to make size and positions thereof equal between video taken spaces.

56. A computer readable recording medium for recording a program for spatio-temporally integrating/managing a plurality of videos according to claim 39, wherein the video structure information managing/storing step spatio-temporally manages/stores by data-compressing extracted subject information, the camcorder operation condition information, the background information, and the shot-to-shot relation information, video data, and all or a part of video taken spaces of a plurality of videos which are resynthesized by using the camcorder operation condition information, the background information, and the shot-to-shot relation information, the video data.

57. A computer readable recording medium for recording a program for spatio-temporally integrating/managing a plurality of videos according to claim 56, wherein the video structure information managing/storing step data-compresses the extracted subject information as the still images by developing the extracted subject information into the space, and data-compresses, as the still images, video taken spaces of a plurality of videos which are resynthesized.

* * * * *

UNITED STATES PATENT AND TRADEMARK OFFICE
CERTIFICATE OF CORRECTION

PATENT NO. : 6,411,339 B1
DATED : June 25, 2002
INVENTOR(S) : Akihito Akutsu et al.

It is certified that error appears in the above-identified patent and that said Letters Patent is hereby corrected as shown below:

Column 8,
Line 51, delete "t0" and insert -- $t_0$ --.

Column 9,
Line 33, delete "$b=x\% \cdot \cos(\alpha)+x \cdot \sin(\alpha)$" and insert -- $b\text{-}x\% \cdot \cos(\alpha)+x \cdot \sin(\alpha)$ --.

Column 13,
Line 26, before "images" insert -- still --.

Signed and Sealed this

Eighteenth Day of March, 2003

JAMES E. ROGAN
*Director of the United States Patent and Trademark Office*